United States Patent [19]

Drent

[11] Patent Number: 4,940,777
[45] Date of Patent: Jul. 10, 1990

[54] CARBON MONOXIDE/1,2-ALKADIENE COPOLYMER

[75] Inventor: Eit Drent, Amsterdam, Netherlands

[73] Assignee: Shell Oil Company, Houston, Tex.

[21] Appl. No.: 339,783

[22] Filed: Apr. 18, 1989

[30] Foreign Application Priority Data

May 4, 1988 [NL] Netherlands ............... 8801168

[51] Int. Cl.$^5$ ............................... C08G 67/02
[52] U.S. Cl. ...................... 528/392; 525/539
[58] Field of Search ................ 528/392; 525/539

[56] References Cited

U.S. PATENT DOCUMENTS

| 3,694,412 | 9/1972 | Nozaki | 260/63 |
| 4,786,714 | 11/1988 | Drent | 528/392 |
| 4,788,279 | 11/1988 | Drent | 528/392 |

FOREIGN PATENT DOCUMENTS 121965 10/1984 European Pat. Off. .
181014 5/1986 European Pat. Off. .

Primary Examiner—Harold D. Anderson
Attorney, Agent, or Firm—Dean F. Vance

[57] ABSTRACT

Novel linear alternating copolymers of carbon monoxide and a 1,2-alkadiene are produced by contacting the carbon monoxide and alkadiene under polymerization conditions in the presence of a catalyst composition formed from a palladium compound, the anion of a non-hydrohalogenic acid having a pKa less than 4 and a bidentate ligand of nitrogen. The novel copolymers are formed in a mixture with linear alternating copolymer of carbon monoxide and ethylenically unsaturated hydrocarbon when an ethylenically unsaturated hydrocarbon is additionally present in the polymerization mixture.

20 Claims, No Drawings

CARBON MONOXIDE/1,2-ALKADIENE COPOLYMER

FIELD OF THE INVENTION

This invention relates to certain novel alternating copolymers of carbon monoxide and 1,2-alkadienes, and to processes of producing such copolymers, alternatively in conjunction with the production of a linear alternating copolymer of carbon monoxide and an ethylenically unsaturated hydrocarbon.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. Pat. No. 1,081,304 produces similar polymers of a higher carbon monoxide content in the presence of alkylphosphine complexes of palladium as catalyst. Nozaki extended the reaction to produce linear alternating polymers of carbon monoxide and olefins in the presence of triarylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent general processes for the production of such polymers is illustrated by a number of published European Patent Applications including 121,965 and 181,014 and U.S. Pat. Nos. 4,786,714 and 4,788,279. The process generally involves the use of a catalyst composition formed from a salt of a Group VIII metal selected from palladium, cobalt or nickel, the anion of a non-hydrohalogenic acid having a pKa less than about 6 and a bidentate ligand of phosphorous, arsenic, antimony or nitrogen.

The resulting polymers, now commonly known as polyketones or polyketone polymers, are relatively high molecular weight materials having established utility as thermoplastics in the production of shaped articles by the methods conventionally employed with thermoplastics.

The polyketone polymers, by virtue of the presence of carbonyl groups, are converted into other types of polymer to modify the properties of the polyketone. The carbonyl groups undergo a number of broadly conventional reactions to produce polymeric derivatives such as polyols, polythiols and polyamines. It is desirable, on occasion, to provide polyketone-type polymers with carbon-carbon unsaturation to enable the polymer to be crosslinked or further functionalized. Attempts to introduce unsaturation within the polyketone polymers as by catalytic reduction of the carbonyl groups to hydroxyl groups followed by dehydration have not been entirely successful because of the undesirable side reactions that take place which alter the linear character of the polymer. It would be of advantage to provide novel polyketone polymers which incorporate carbon-carbon unsaturation and a process of producing such linear alternating polymers.

SUMMARY OF THE INVENTION

The invention provides certain linear alternating polymers of carbon monoxide and certain unsaturated hydrocarbons which incorporate carbon-carbon unsaturation. More particularly, the invention relates to a process of producing linear alternating copolymers of carbon monoxide and a 1,2-alkadiene as well as mixtures of such copolymers with linear alternating copolymers of carbon monoxide and an ethylenically unsaturated hydrocarbon.

DESCRIPTION OF THE INVENTION

The novel copolymers of the present invention are linear alternating copolymers of carbon monoxide and a 1,2-alkadiene wherein the polymeric unit derived from the alkadiene retains carbon-carbon unsaturation. The 1,2-alkadienes which are suitable in the process of the invention are represented by the formula

  (1)

wherein R is alkyl, preferably lower alkyl of up to 4 carbon atoms inclusive. Illustrative of such 1,2-alkadienes are propadiene (allene), 1,2-butadiene, 1,2-pentadiene and 1,2-hexadiene. The preferred alkadiene reactants are propadiene or 1,2-butadiene, particularly propadiene.

The novel polymers of the invention are produced by the reaction of carbon monoxide and the alkadiene in the presence of a catalyst composition preferably formed from a compound of palladium, the anion of certain strong non-hydrohalogenic acids and a bidentate ligand of nitrogen. Suitable compounds of palladium which serve as a precursor of the catalyst composition are salts of palladium, particularly palladium carboxylates. Preferred palladium salts are palladium alkanoates and palladium acetate, palladium proprionate and palladium hexanoate are suitable. The preferred palladium alkanoate is palladium acetate.

The anion of strong acid which is suitable as a catalyst composition precursor is the anion of a non-hydrohalogenic acid having a pKa of less than 4, as determined in aqueous solution at 18° C. These acids are illustrated by inorganic acids such as sulfuric acid, phosphoric acid and perchloric acid as well as by organic acids including carboxylic acids such as trifluoroacetic acid, trichloroacetic acid and tartaric acid, and sulfonic acids such as methansulfonic acid and p-toluenesulfonic acid. The anion is preferably an anion of an acid having a pKa less than 2 and the anions of trifluoroacetic acid and p-toluenesulfonic acid are a preferred class of anions. The anion is suitably provided as the acid or alternatively as a salt of the acid, preferably a non-noble transition metal salt of the acid, especially a copper salt. Provision of the anion in the form of the acid is preferred, however, and the anion is provided in a quantity of from about 0.5 equivalent to about 50 equivalents per gram atom of the palladium (calculated as the metal). Preferably the anion is provided in a quantity of from about 1 equivalent to about 25 equivalents per gram atom of the palladium.

The bidentate ligand useful as a precursor of the catalyst compositions of the process of the invention is a bidentate ligand of nitrogen. In contrast with the copolymerization of carbon monoxide and ethylenically unsaturated hydrocarbons, bidentate ligands of phosphorous, arsenic, antimony or nitrogen are not suitable and use of bidentate phosphorus ligands such as 1,3-bis(-diphenylphosphino)propane does not provide the desired polymers. In the copolymerization of carbon monoxide and 1,2-alkadienes to produce linear alternating copolymers, the use of certain bidentate ligands of nitrogen is required. The preferred bidentate ligands of nitrogen are represented by the formula

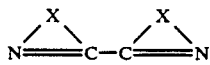
(II)

where X independently is an organic bridging group of up to ten carbon atoms and up to 2 nitrogen atoms, with from 3 to 4 atoms in the bridge at least two of which are carbon atoms. Illustrative of suitable bidentate nitrogen ligands is the class of 2,2'-bipyridines including alkylated 2,2'-bypyridines, e.g., 2,2'-bipyridine, 4,4'-dimethyl-2,2'-bipyridine and 5,5'-diethyl-2,2'-bipyridine, and the class of 1,10-phenanthrolines including alkylated and halogenated derivatives thereof, e.g., 1,10-phenanthroline and 5-chloro-1,10-phenanthroline. The preferred bidentate ligands of nitrogen are 2,2'-bipyridine and 1,10-phenanthroline, particularly 2,2'-bipyridine.

The bidentate nitrogen ligand is employed in a quantity of from 0.5 mol to about 200 mols per mole of palladium, preferably in a quantity of from about 1 mol to about 50 mols per mol of palladium. The amount of catalyst composition to be employed is that which is sufficient to provide from about $1 \times 10^{-7}$ mol to about $1 \times 10^{-3}$ mol of palladium per mole of alkadine monomer. Amounts of catalyst sufficient to provide from about $1 \times 10^{-6}$ mol to about $1 \times 10^{-4}$ mol of palladium per mole of alkadiene are preferred.

It is, on occasion, useful to provide as an additional catalyst composition component an organic oxidant and organic oxidants including quinones, both 1,4-quinones and 1,2-quinones, aliphatic nitrites such as butyl nitrite, aromatic nitro compounds such as nitrobenzene, and peroxides such as di-tert-butyl peroxide are suitable. Preferred organic oxidants are quinones of up to 10 carbon atoms including benzoquinones, napthoquinones and anthraquinones. The preferred quinones are 1,4-quinones and especially preferred is 1,4-benzoquinone. The presence of an oxidant in the catalyst composition is not required, but if present amounts up to about 10,000 mols per mol of palladium are satisfactory. When present, amounts of oxidant from about 10 mols to about 5000 mols per mole of palladium are required.

The production of the linear alternating copolymers of carbon monoxide and 1,2-alkadiene is conducted by charging the monomeric reactants and catalyst composition to a suitable reactor together with a reaction diluent. Suitable reaction diluents are inert to the reactants and catalyst composition and are liquid under the conditions at which polymerization takes place. The reaction mixture is maintained at the polymerization conditions and reactant/catalyst composition contact is maintained by conventional methods such as shaking or stirring. Polymerization conditions include a reaction temperature of from about 25° C. to about 140° C., preferably from about 50° C. to about 120° C. Typical reaction pressures are from about 20 bar to about 150 bar, but preferably from about 30 bar to about 100 bar. Subsequent to reaction, the polymer product is recovered from the product mixture by well known procedures such as filtration and decantation.

The polymer product is a linear alternating polymer of the carbon monoxide and 1,2-alkadiene reactans and is represented by the repeating formula

(III)

wherein G is a moiety of the alkadiene reactant of formula (I) polymerized through only a portion of the carbon-carbon unsaturation so that the moiety derived from the 1,2-alkadiene retains carbon-carbon unsaturation which can be used as a reactive site for the cross-linking of the polymeric molecule or for further functionalization of the polymer. Moreover, the polymer is thermoplastic and processed by conventional methods for thermoplastics, including injection molding and thermoforming into shaped objects such as containers.

In a second modification of the process of the invention the catalyst system is employed to produce mixtures of a copolymer of carbon monoxide and a 1,2-alkadiene and a copolymer of carbon monoxide and an ethylenically unsaturated hydrocarbon by including within the reaction mixture an ethylenically unsaturated hydrocarbon. Suitable ethylenically unsaturated hydrocarbons have up to 10 carbon atoms inclusive and include ethylene and other alpha-olefins such as propylene and 1-butene or aryl-substituted olefins such as styrene and p-methylstyrene.

The preferred ethylenically unsaturated hydrocarbon is ethylene. The product formed when an ethylenically unsaturated hydrocarbon is present with carbon monoxide and 1,2-alkadiene is not a terpolymer of the three monomers but is instead a mixture of the carbon monoxide/alkadiene copolymer of the above formula (III) and a linear alternating copolymer of carbon monoxide and the ethylenically unsaturated hydrocarbon. Such a copolymer is represented by the repeating formula

(IV)

wherein D is the moiety of the ethylenically unsaturated hydrocarbon polymerized through the ethylenic unsaturation.

In the preferred modification of the process of the invention, no ethylenically unsaturated hydrocarbon is present, but when, in other modifications the ethylenically unsaturated hydrocarbon is present, amounts of ethylenically unsaturated hydrocarbon up to about 200 mols per mol of 1,2-alkadiene are satisfactory but amounts up to about 100 mols per mol of 1,2-alkadiene are preferred. The amount of carbon monoxide to be employed is from about 0.1 mol to about 10 mols per mol of total hydrocarbon monomeric reactant, preferably from about 0.2 mol to about 5 mols per mol of total hydrocarbon monomeric reactant.

When mixed copolymer product is obtained, the mixture retains thermoplastic character and is processed into useful shaped articles as described above.

The invention is further illustrated by the following Comparative Examples (not of the invention) and Illustrative Embodiments which should not be construed as limiting the invention. In each case where polymer product was obtained, examination of the product by $^{13}$C-NMR analysis confirmed that the polymer or polymers produced were linear alternating copolymers of carbon monoxide and the unsaturated hydrocarbon employed.

COMPARATIVE EXAMPLE I

To an autoclave of 250 ml capacity was charged a catalyst composition solution formed from 50 ml of methanol, 0.1 mmol of palladium acetate, 2 mmol of trifluoroacetic acid and 0.15 mmol of 1,3-bis(diphenylphosphino)propane. After air present in the autoclave was removed by evacuation, propadiene was added to give a pressure of 5 bar and carbon dioxide was added to give a pressure of 35 bar. The autoclave and contents were then heated to 80° C. After 5 hours, the autoclave was cooled and the pressure released. Examination of the contents of the autoclave revealed that no polymer was formed.

COMPARATIVE EXAMPLE II

The procedure of Comparative Example I was repeated except that the mixture within the autoclave contained 1,2-butadiene instead of propadiene and the pressure of carbon monoxide was 40 bar instead of 35 bar.

No polymer product was formed.

ILLUSTRATIVE EMBODIMENT I

A copolymer of carbon monoxide and propadiene was produced by charging to an autoclave of 250 ml capacity a catalyst composition solution formed from 50 ml of methanol, 0.1 mmol of palladium acetate, 2 mmol of p-toluenesulfonic acid, 3 mmol of 2,2'-bipyridine and 20 mmol of 1,4-benzoquinone. After the air present in the autoclave was removed by evacuation, sufficient propadiene was added to give a pressure of 5 bar and sufficient carbon monoxide was added to give a pressure of 35 bar. The contents of the autoclave were heated to 80° C. and maintained at that temperature for 5 hours. The polymerization was then terminated by cooling to room temperature and releasing the pressure. The polymer product was recovered by filtration, washed with methanol and dried in vacuo at room temperature. The yield of copolymer was 2.2 g.

ILLUSTRATIVE EMBODIMENT II

A carbon monoxide/propadiene copolymer was prepared by a procedure substantially similar to that of Illustrative Embodiment I except that no benzoquinone was added. The yield of copolymer was 1.5 g.

ILLUSTRATIVE EMBODIMENT III

A carbon monoxide/propadiene copolymer was produced by a procedure substantially similar to that of Illustrative Embodiment I except that the reaction temperature was 110° C. instead of 80° C. The yield of copolymer was 11 g.

ILLUSTRATIVE EMBODIMENT IV

A carbon monoxide/propadiene copolymer was produced by a procedure substantially similar to that of Illustrative Embodiment III, except that no benzoquinone was added. The yield of copolymer was 7.5 g.

ILLUSTRATIVE EMBODIMENT V

A copolymer of carbon monoxide and propadiene was produced by a procedure substantially like that of Illustrative Embodiment I except that no benzoquinone was added, the catalyst solution contained 3 mmol of 1,10-phenanthroline instead of 2,2'-bipyridine and 0.5 mmol instead of 2 mmol of p-toluenesulfonic acid and the reaction temperature was 110° C. instead of 80° C. A yield of 7.2 g of copolymer was obtained.

ILLUSTRATIVE EMBODIMENT VI

A carbon monoxide/propadiene copolymer was produced by a procedure substantially similar to that of Illustrative Embodiment I, except that no benzoquinone was added and the catalyst composition solution contained trifluoroacetic acid instead of p-toluenesulfonic acid. The yield of copolymer was 7.5 g.

ILLUSTRATIVE EMBODIMENT VII

A copolymer of carbon monoxide and 1,2-butadiene was produced by a procedure substantially similar to that of Illustrative Embodiment I except that 1,2-butadiene was added instead of propadiene, the pressure of carbon monoxide was 40 bar instead of 35 bar, the catalyst composition solution contained 0.5 mmol of p-toluenesulfonic acid instead of 2 mmol and the reaction time was 1 hour instead of 5 hours. The yield of copolymer was 9 g.

ILLUSTRATIVE EMBODIMENT VIII

A copolymer of carbon monoxide and 1,2-butadiene was produced by a procedure substantially like that of Illustrative Embodiment I except that the catalyst solution contained no benzoquinone and 0.5 mmol of p-toluenesulfonic acid instead of 2 mmol, sufficient 1,2-butadiene was used to give a pressure of 0.5 bar instead of propadiene and the pressure of carbon monoxide was 40 bar instead of 35 bar, the reaction temperature was 60° C. instead of 80° C. and the reaction time was 1 hour instead of 5 hours. The yield of copolymer was 9.2 g.

ILLUSTRATIVE EMBODIMENT IX

A mixture of copolymers of carbon monoxide and 1,2-butadiene and of carbon monoxide and ethylene was produced by a procedure substantially similar to that of Illustrative Embodiment I except that the catalyst composition solution contained 0.5 mmol of p-toluenesulfonic acid instead of 2 mmol and 10 mmol of 1,4-benzoquinone instead of 20 mmol, the mixture contained sufficient 1,2-butadiene to give a pressure of 0.5 bar instead of the propadiene, the carbon monoxide pressure was 30 bar instead of 35 bar, sufficient ethylene was added to give an ethylene pressure of 20 bar, and the reaction temperature was 65° C. instead of 85° C.

A mixture of 7.5 g of two copolymers was obtained as shown by $^{13}$C-NMR. The mixture was 25% mol of a carbon monoxide/1,2-butadiene copolymer and 75% mol of a carbon monoxide/ethylene copolymer.

What is claimed is:

1. A linear alternating copolymer of carbon monoxide and 1,2-alkadiene having repeating units of the formula

wherein G is an unsaturated moiety of a 1,2-alkadiene of the formula $CH_2\!=\!C\!=\!CH\!-\!R$ in which R is alkyl, polymerized through carbon-carbon unsaturation.

2. The copolymer of claim 1 wherein R is lower alkyl.

3. The copolymer of claim 2 wherein the 1,2-alkadiene is propadiene.

4. The copolymer of claim 2 wherein the 1,2-alkadiene is 1,2-butadiene.

5. An admixture obtained by mixing together:
(a) a linear alternating copolymer of carbon monoxide and 1,2-alkadiene having repeating units of the formula

wherein G is an unsaturated moiety of a 1,2-alkadiene of the formula $CH_2=C=CH-R$ in which R is alkyl, polymerized through carbon-carbon unsaturation, and
(b) a linear alternating copolymer of carbon monoxide and a monoethylenically unsaturated hydrocarbon.

6. The admixture of claim 5 wherein the monoethylenically unsaturated hydrocarbon is ethylene and the 1,2-alkadiene is propadiene.

7. The admixture of claim 5 wherein the monoethylenically unsaturated hydrocarbon is ethylene and the 1,2-alkadiene is 1,2-butadiene.

8. A process for the production of a linear alternating copolymer of carbon monoxide and a 1,2-alkadiene which comprises contacting the carbon monoxide and alkadiene under polymerization conditions in a liquid diluent in the presence of a catalyst composition formed from a compound of palladium, the anion of a non-hydrohalogenic acid having a pKa less than about 2 and a bidentate ligand of nitrogen.

9. The process of claim 8 wherein the 1,2-alkadiene is represented by the formula $$CH_2=C=CH-R$$

wherein R is lower alkyl and the bidentate ligand is represented by the formula

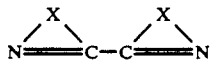

where X independently is a bridging group of up to 10 carbon atoms and up to 2 nitrogen atoms with from 3 to 4 atoms in the bridge, at least two of which are carbon atoms.

10. The process of claim 9 wherein the ligand is a 2,2'-bipyridine or a 1,10-phenanthroline.

11. The process of claim 10 wherein the anion is the anion of trifluoroacetic acid or p-toluenesulfonic acid.

12. The process of claim 11 wherein the palladium salt is palladium acetate.

13. The process of claim 12 wherein the alkadiene is propadiene or 1,2-butadiene.

14. The process of claim 13 wherein the ligand is 2,2'-bipyridine.

15. The process of claim 14 wherein the alkadiene is propadiene.

16. The process of claim 14 wherein the alkadiene is 1,2-butadiene.

17. The process of claim 8 wherein a monoethylenically unsaturated hydrocarbon of up to 10 carbon atoms inclusive is additionally present.

18. The process of claim 17 wherein the monoethylenically unsaturated hydrocarbon is ethylene.

19. The process of claim 13 wherein a monoethylenically unsaturated hydrocarbon of up to 10 carbon atoms inclusive is additionally present.

20. The process of claim 19 wherein the alkadiene is propadiene and the monoethylenically unsaturated hydrocarbon is ethylene.

* * * * *